United States Patent [19]

Spieler et al.

[11] Patent Number: 4,913,640

[45] Date of Patent: Apr. 3, 1990

[54] PRESS FOR MAKING SANITARY ARTICLES, IN PARTICULAR TOILET BOWLS, BY PRESSURE CASTING

[75] Inventors: Gerold Spieler, Laufen, Switzerland; Walter Schlagenhaft, Penzberg, Fed. Rep. of Germany

[73] Assignee: Dorst Maschinen- und Anlagenbau, Otto Dorst und Dipl.-Ing. Walter Schlegel GmbH & Co., Fed. Rep. of Germany

[21] Appl. No.: 276,373

[22] Filed: Nov. 23, 1988

[30] Foreign Application Priority Data

Nov. 26, 1987 [DE] Fed. Rep. of Germany ....... 3740163

[51] Int. Cl.[4] .............................................. B29C 43/36

[52] U.S. Cl. .................................... 425/195; 249/120; 249/160; 425/406; 425/451; 425/451.9

[58] Field of Search ............ 425/195, 451, 453, 451.2, 425/451.9, 185, 406, 193; 249/120, 160

[56] References Cited

U.S. PATENT DOCUMENTS

| | | | |
|---|---|---|---|
| 3,559,235 | 2/1971 | Hagen | 425/195 X |
| 3,671,160 | 6/1972 | Derror | 425/185 X |
| 3,852,017 | 12/1974 | Derror | 425/451 |
| 3,894,825 | 7/1975 | Westermann | 425/195 |
| 4,038,015 | 7/1977 | Dawson | 425/451 X |
| 4,318,679 | 3/1982 | Moore | 249/120 X |
| 4,374,635 | 2/1983 | Carucci et al. | 249/120 X |
| 4,468,368 | 8/1984 | Hafele | 425/451 X |
| 4,613,475 | 9/1986 | Hettinga | 425/451.9 X |
| 4,758,147 | 7/1988 | Inaba | 425/195 X |

FOREIGN PATENT DOCUMENTS

| | | | |
|---|---|---|---|
| 0089317 | 9/1983 | European Pat. Off. . | |
| 3319012 | 12/1983 | Fed. Rep. of Germany . | |
| 1359684 | 7/1974 | United Kingdom . | 425/451.9 |

OTHER PUBLICATIONS

Das DruckgieBen–eine neue Dimension, Keramische Zeitschrift, 37 Jahrgang, Nov. 4, 1985, pp. 187–189.

*Primary Examiner*—Richard L. Chiesa

*Attorney, Agent, or Firm*—Reese Taylor

[57] ABSTRACT

In a press for making sanitary articles, in particular toilet bowls, by pressure casting, mounting plates bearing the mold parts for forming the mold are suspended on slides along portals which extend radially outward from the center of the press. In the closed position of the press, suspension frames bearing the receiving plates are mechanically locked.

22 Claims, 3 Drawing Sheets

PRESS FOR MAKING SANITARY ARTICLES, IN PARTICULAR TOILET BOWLS, BY PRESSURE CASTING

BACKGROUND OF THE INVENTION

Pressure casting in general is a modern casting process for manufacturing of sanitary ware and carried out mechanically with a pressure up to 40 bar. The mold is made of a special material and can be sold from Keramik Holding AG, Laufen, Switzerland and described in European patent application No. 83 81 01 07.9 (published under No. 0 089 317). Pressure casting in general is described in various articles, for example in journal "Keramische Zeitschrift", 37. annual, No. 4, 1985, pages 187 to 189.

In particular when producing toilet bowls one must, due to the relatively complicated shape, use a plurality of mold parts to form a closed mold cavity suitable for manufacturing a toilet bowl by pressure casting. In conventional presses (DE-A-33 19 012), the mold parts are moved together along pillar guides by means of hydraulic cylinders to form the mold. The closing pressure on the mold parts is applied by the same hydraulic cylinders that move together the clamping plates bearing the mold elements. Since in pressure casting the ceramic slip introduced into the mold after the latter is closed is solidified under high casting pressure to form a body, corresponding counterforces built up within the mold which must be compensated hydraulically from outside to maintain a uniform sealing surface over the entire mold seam or partition line between the mold parts. This requires elaborate automatic control measures in addition to the constructional efforts such a press requires due to the pillar guides of relatively large diameter.

The invention is based on the problem of providing a press for pressure casting sanitary articles, in particular toilet bowls, which is of simple and robust construction and is easy to operate even when producing sanitary articles requiring more than two mold parts for molding. Furthermore, it should ensure ready access to all components of the press for the purpose of removing the parts and performing assembly, dismantling and service tasks.

SUMMARY OF THE INVENTION

According to the invention, the press usable for pressure casting sanitary articles of complicated shape, such as in particular toilet bowls, is characterized by suspended guidance and motion of the mounting means bearing the mantle parts or lateral mold parts for forming the mold, the suspension frames bearing the mounting means being firmly lockable mechanically in their position in the closed position of the press. The final closing motion of the mold is produced after the suspension frames have been mechanically locked, by further advancing the mounting plates relative to the suspension frames using separate drive assemblies and thereby pressing or biasing them in conjunction with the other mold parts, in particular the lower mold part, into the closed position of the mold. With such a press design one can use technically simple machine parts, for example rack-and-pinion gears or crank gears, for advancing the slides or suspension frames into the closed position of the press, and simple hydraulic cylinders for advancing the mounting means into the closed position of the mold and for returning the mounting means from the closed position. Due to the suspended arrangement of the mounting plates via slides on portals, one has ready access on all sides to the center of the press as well as to the other parts of the press, which facilitates assembly tasks and any servicing tasks.

It is expedient to effect the locking by interlocking forks and eyes or shackles which are provided with transverse bores for taking up lock bolts. To ensure the lock can adapt to different molds, one of the locking members cooperating in pairs is expediently adjustable in its position.

A constructionally favorable arrangement, in particular with respect to the production of toilet bowls, is obtained by disposing the portals on which the slides are suspended in a cross shape. The ends of the portals are expediently supported on the foundation by vertical stands. To close the mold from the bottom, a lifting means for the lower mold part, which is likewise disposed on a mounting plate, is expediently provided below the press stand, whereas an upper mold part is supported, if required, via a counterholder which is operated hydraulically.

The inventively designed press is characterized by a simple and robust construction with ready access to all parts, whereby the absorption and dissipation of forces during operation of the press are also optimal.

In the following, a preferred exemplary embodiment of the invention shall be described with reference to the drawings.

BRIEF DESCRIPTION OF THE PREFERRED EMBODIMENT

Figure 3:
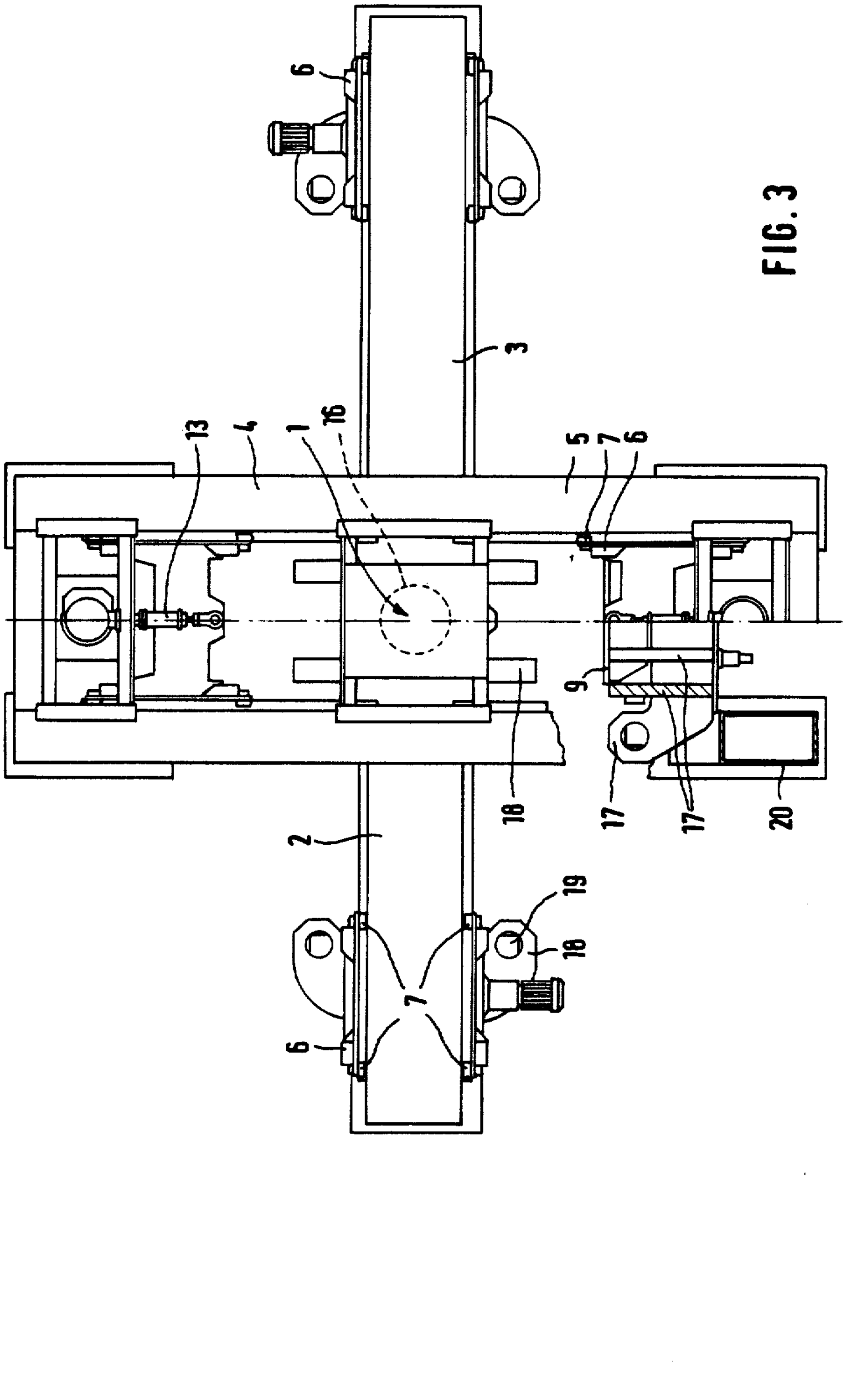
FIG. 3 shows a top view of the press shown in FIG. 1.

The press has a central press structure. From the center of the press, portal halves 2, 3, 4 and 5 extend radially horizontally outward. These two portals 2, 3 and 4, 5 disposed in a cross shape according to FIG. 3 bear slides 6 which are directed on both sides by rolls 7 running on appropriate guide rails on the portal. Each slide 6 has attached thereto a suspension frame 8 extending downwardly from the portal and each bearing a mounting plate 9 which is taking up the corresponding mold part.

Figure 1:
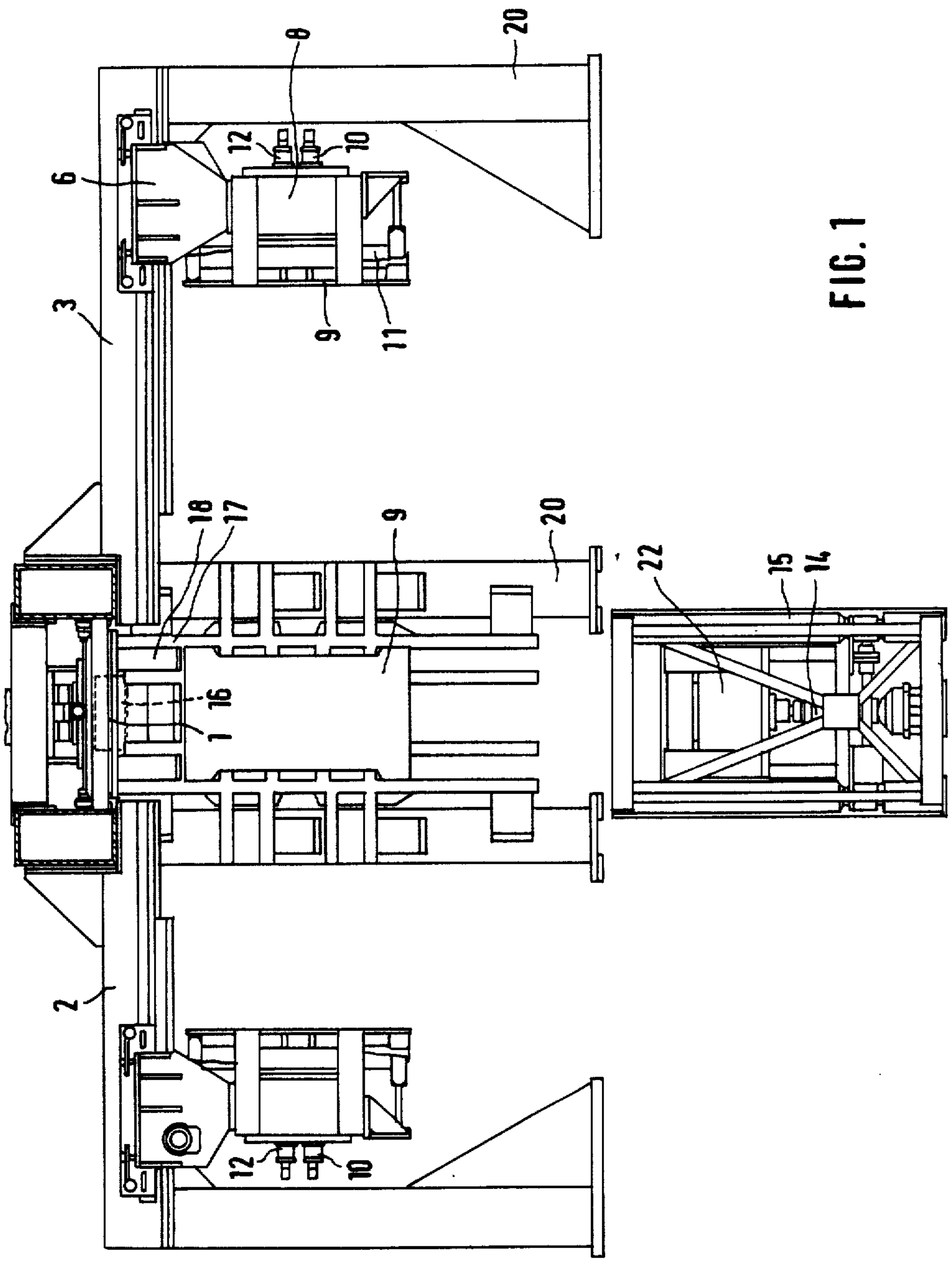
FIG. 1 shows a side view of a preferred embodiment of a press with clamping plates returned to their starting positions.

The drive for the two slides 6 shown in FIG. 1 and movable along portal halves 2 and 3 is effected via a rack-and-pinion gear which is not shown in any detail in the drawing. A rack gear is provided on both portal halves of each portal.

In accordance with FIG. 1, receiving plates 9 can be advanced by hydraulic cylinders 10 relative to the suspension frame toward the center of the press referred to as 1, the parallel motion of mounting plate 9 along an axis parallel to the axes of portal halves 2 and 3 being ensured by a lazy tongs mechanism 11 which is of conventional structure and therefore neither described nor shown in detail. This lazy tongs mechanism is enabling a parallel movement of the mounting plate relative to the suspension frame on which the mounting plate is arranged. The return motion of mounting plate 9 to suspension frame 8 is effected via pull-back cylinders referred to as 12. The cylinders 12 can be hydraulically or pneumatically actuated.

The drive of the mounting plates of the two other slides 6, namely the slides movable at right angles to the plane of projection of FIG. 1, is effected via a crank gear 13 in each case. These slides 6 are also guided by rolls 7 on both sides, as shown quite clearly in FIG. 3.

Below the center of the portals determined by their intersection, there is a lifting means 14 expediently disposed in a recess in the foundation, guided along four pillars 15 and bearing the mold part that limits from the bottom the mold formed by the mold parts. Analogously to the horizontally movable mold parts, this mold part is disposed on a mounting plate which is movable via a hydraulic cylinder relative to the lifting frame in the direction of motion thereof in order to bias the mold part from the bottom into the closed position of the mold. From the top there is action fromm a hydraulically driven counterholder, that is not explained in any detail here, the corresponding hydraulic cylinder being referred to as 16 in FIG. 1. If required, the counterholder can take up a mold part which, like the above-described mold parts, can be biased via a movable mounting plate after mechanical locking.

Figure 2:
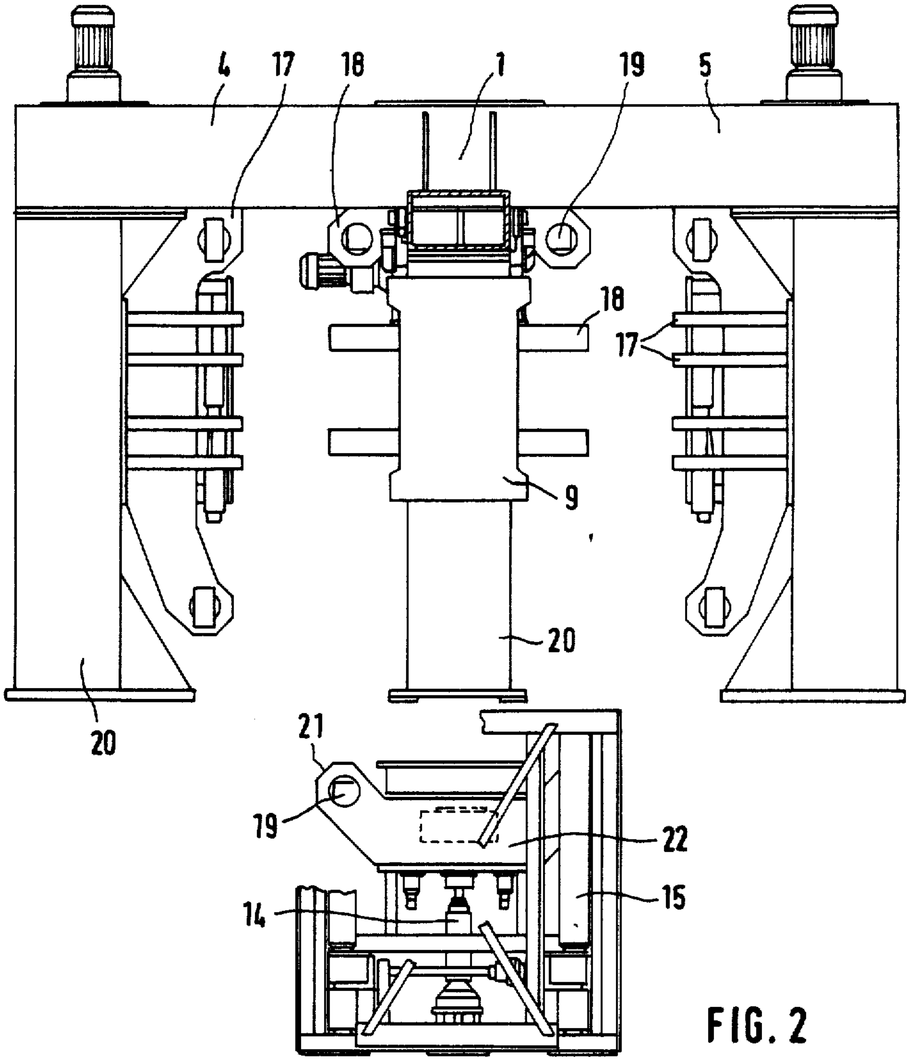
FIG. 2 shows a side view turned through 90 degrees of the press shown in FIG. 1.

On each lateral suspension frame 8 there are also mechanical locking elements which in the closed position of the press cooperate with corresponding mechanical locking elements fixed in the center of the press, so as to allow for mechanical locking of suspension frame 8 in its position in the closed position of the press. In the embodiment shown, the locking elements are formed by forks 17 on suspension frames 8, as best seen in FIG. 1, said forks being engaged in the closed position of the press by corresponding shackles or eyes 18 in the center of the press superstructure which are cooperating with the forks (inergripping action). The shackles or eyes are fixed and stationary with respect to the press superstructure, being disposed for example on the portal frame in the center of the press or on the counterholding plate taking up hydraulic cylinder 10 to be described in the following. Forks 17 and eyes or shackles 18 are provided with appropriate transverse bores 19, so that when they are engaged the locking is effected by a lock bolt inserted through the transverse bores. Such a transverse bore is apparent in FIG. 2 and referred to as 19.

The mode of operation of the press is as follows. To close it, slides 6 dispose on portal halves 2, 3, 4 and 5 are moved by the rack-and-pinion gears and crank gears 14 toward center 1 of the press until the mold parts on mounting plates 9 lie against each other. At the same time the lower mold part is raised by lifting means 14, so that the mold parts finally limit the mold cavity for taking up the ceramic slip. There is no feed motion from above in the described embodiment. The support from above is effected only via a counterholding plate, being effected hydraulically due to a hydraulic cylinder 16. After the press is closed it is mechanically locked by forks 17 of suspension frames 8 engaged with eyes 18, and lower forks 17 of suspension frames 8 engaged with eyes or shackles 21 on lifting frame 22 being locked by lock bolts. The mold is then closed by advancing mounting plates 9 relative to slides 6 to a limited extent and moving the mounting plate for the lower mold part upward relative to lifting frame 22, thereby pressing the mold parts on mounting plates 9 to lie against each other with a predetermined closing pressure. After the closing pressure is applied, the mold is filled by introducing a ceramic slip under pressure. The return motion of the clamping plates is effected via separate pull-back cylinders 12.

We claim:

1. A press for making sanitary articles, in particular toilet bowls, by pressure slip casting into a mold having a plurality of mold parts, the press comprising:
   - a press superstructure having a central press structure;
   - a plurality of guide portals extending radially from said central press structure and having an axis along its lateral dimension;
   - at least two slides rollingly engagable with said guide portals such that each said slide is free to move laterally along the length of each said guide portal;
   - a suspension frame suspended from each said slide;
   - mounting plates affixed to each said suspension frame;
   - each said mounting plate being configured so as to accept one of the mold parts;
   - first drive means in operative communication with said suspension frames such that each said suspensionn frame is caused to move in a direction toward or away from another said suspension frame, the movement of each said suspension frame being effected via said lateral rolling movement between said slides and said guide portals;
   - said lateral rolling movement causing the mold parts affixed to said mounting plates to move between an open and closed position;
   - second drive means in operative communication with at least one of said mounting plates, such that movement of said mounting plate may be effected independently of said movement of said suspension frames;
   - locking means in operative engagement with said suspension frames and locking said suspension frames together when the mold parts are in the closed position.

2. A press as in claim 1, wherein each said mounting plate is disposed at a right angle to said axis of each said guide portal.

3. A press as in claim 2, wherein there are two said guide portals disposed at right angles to each other.

4. A press as in claim 2, wherein said movement of each said mounting plate is parallel to at least one said axis of said guide portals.

5. A press as in claim 4, further comprising guide means in operative communication with each said mounting plate.

6. A press as in claim 5, wherein said guide means include a scissor mechanism.

7. A press as in claim 1, wherein said locking means include a plurality of shackles affixed to said press superstructure.

8. A press as in claim 7, wherein said shackles are provided with transverse bores.

9. A press as in claim 8, wherein said locking means further include a plurality of locking forks affixed to said suspension frames and protruding in a direction toward said central press structure.

10. A press as in claim 9, wherein each said fork is provided with a transverse bore.

11. A press as in claim 10, wherein said forks and said shackles are configured to permit intergripping engagement between said forks and said shackles.

12. A press as in claim 11, wherein said intergripping engagement of said forks and said shackles is locked by a lock bolt positioned through both said transverse bores of each said forks and said shackles.

13. A press as in claim 12, wherein at least one said fork is laterally adjustable in a direction parallel to at least one said axis of said guide portals.

14. A press as in claim 12, wherein at least one of said shackles is laterally adjustable in a direction parallel to at least one said axis of said guide portals.

15. A press as in claim 12, further comprising a lifting frame positioned below said central press structure and an hydraulically operated counterholder positioned above said central press structure.

16. A press as in claim 15, wherein said lifting frame is biased in a direction toward said central press structure by first lifting drive means.

17. A press as in claim 16, wherein said lifting frame has a lifting plate affixed thereto.

18. A press as in claim 17, wherein said lifting plate is configured so as to carry one of the mold parts.

19. A press as in claim 18, wherein said lifting frame is provided with at least one lifting frame shackle.

20. A press as in claim 19, wherein said lifting frame shackle is engagable with at least one of said forks of said suspension frames.

21. A press as in claim 20, wherein said lifting frame plate is moveable independently of said lifting frame.

22. A press as in claim 21, wherein said lifting plate is biased by a lifting palte drive means.

* * * * *

UNITED STATES PATENT AND TRADEMARK OFFICE

CERTIFICATE OF CORRECTION

PATENT NO. : 4,913,640

DATED : April 3, 1990

INVENTOR(S) : Gerold Spieler and Walter Schlagenhaft

It is certified that error appears in the above-identified patent and that said Letters Patent is hereby corrected as shown below:

In Column 3, Line 19, delete "fromm" and substitute therefor --from--.

In Column 3, Line 37, delete "inergripping" and substitute therefor --intergripping--.

In Column 3, Line 48, delete "dispose" and substitute therefor --disposed--.

In Column 4, Lines 22-23, delete "suspensionn" and substitute therefor --suspension--.

In Column 6, Line 16, delete "palte" and substitute therefor --plate--.

Signed and Sealed this

Twenty-third Day of July, 1991

*Attest:*

HARRY F. MANBECK, JR.

*Attesting Officer*

*Commissioner of Patents and Trademarks*